Patented Oct. 9, 1934

1,976,190

UNITED STATES PATENT OFFICE 1,976,190

WALL PANEL AND ART OF PRODUCING THE SAME

Harry Edward Pfaff, Lloyd Russel Shaffer, and Alexander Metherell, Hamilton, Ontario, Canada, assignors to Tajmal Limited, Hamilton, Ontario, Canada, a company of Canada No Drawing. Application July 19, 1932, Serial No. 623,398

5 Claims. (Cl. 106—29)

This invention relates to wall panels and to an art of producing the same.

Among the objects of this invention are the production, in a simple and inexpensive manner, of a wall board or panel especially suitable for interior usage as wall paneling, partitions, screens and the like; which is of a strong, durable and fireproof nature, well adapted to withstand the varying conditions of actual use and yet which is light in weight, lending itself to an ease and economy of handling and installation; and which is adapted to a ready shaping and working to give a finished product pleasing to the eye.

The invention accordingly consists in the combinations of elements, mixtures of materials and compositions of ingredients, and in the several steps and relation and order of each of the same to one or more of the others, all as will be illustratively described herein, and the scope of the application of which will be indicated in the following claims.

Referring now to the manner of producing a preferred form of our wall board or panel, calcined magnesite, preferably free of carbon dioxide and lime, is mixed in the dry state with wood sawdust in the proportions of 12 pounds of the calcined magnesite to 3 pounds of sawdust.

To the dry mix so prepared is added 14 pounds of an aqueous solution of magnesium-chloride preferably of a density of 18° Baumé (the solution being specially prepared in a manner more particularly described hereinafter), and 4 ounces of syrup, preferably molasses or corn syrup. The two liquids just referred to are mixed together before adding them to the dry mix.

In order to give a fluid mix of a uniform fine consistency, the dry mix is usually worked or stirred while the mixed solution is being added. The whole results in a creamy fluid mixture sufficiently thin to be readily poured into a form or mold and yet sufficiently stiff so as to prevent a settling out of certain of the solid ingredients.

This mix is poured into a mold of the desired shape and surface contour where it is allowed to set or harden for about 24 hours. The hardened mass is then removed and cured at medium dry room temperature for from 7 to 30 days after which it is ready for use; the thicker or more massive pieces proportionately requiring the longer curing periods.

The board or panel thus produced is light and strong and sufficiently soft to be sawed, planed, nailed or otherwise worked yet sufficiently hard to withstand the handling and wear of actual use.

As indicated above, the magnesium-chloride solution is specially prepared preferably in the following manner; water is first put into a vat of wood, earthenware, porcelain or a like non-corrosive material, and dry magnesium-chloride then added. The dry magnesium-chloride is readily soluble and goes into solution accompanied by considerable working and bubbling of the liquid; the liquid may be stirred by a suitable paddle to hasten the dissolution of the dry material. Just sufficient magnesium-chloride is added to bring the resultant solution up to the desired density, conveniently measured in degrees Baumé.

To give a clear and pure solution, the liquid is preferably allowed to stand in the vat for a period of from 3 to 7 days (the longer period being required for the larger vats) after which it may be run out of the vat ready for use. In removing the liquid from the vat, the latter is usually tapped at a level well above the sediment formed on its bottom yet at a level well beneath any possible scum remaining on the surface of the liquid. This may be accomplished either by siphoning or by drawing the liquid off through a bung at the level indicated.

In the molding operation, a mold or form having a hard bottom face of the desired character, either plain or figured, is used. The bottom of the mold may be of glass, Allegheny metal, steel or the like properly cleaned and polished. The sides are made of any suitable material, such as wood, which is comparatively inexpensive yet sufficiently durable to withstand the duty imposed.

To prevent undue sticking of the molded product to the sides and bottom face of the mold, the latter is cleaned and rubbed over with any suitable oil, such as olive oil or lard oil, prior to the pouring of the fluid mix. Excess oil is removed from the mold immediately before the mix is poured into it by rubbing its bottom and side walls with a suitable cloth. There should remain, however, a thin film of oil over the inner surfaces of the mold to prevent sticking of the product to the mold in setting.

Where wood side walls are used, they are preferably made impervious to moisture in order to prevent absorption and premature hardening of the product either by waxing them or by oiling them as described above. An impervious coating of a more permanent nature may be given the wood side walls, where the mold is to be used for products at normal temperatures, by applying a suitable coating of shellac which is later oiled or waxed as more particularly described above.

To assure a product of even thickness and uniform consistency, the mold is preferably supported in a horizontal plane whereby the fluid mix distributes itself over the mold bottom to a desired uniform depth.

The mixture is permitted to set or harden as above indicated and the resultant product then removed from the mold and cured. In curing, the product is preferably placed on a grill consisting of a plurality of parallel angle-iron sections in relatively close spaced relation having their upper work-supporting edges in a common horizontal plane, with the finished surface (formed on the bottom surface of the mold) uppermost. A free circulation of air is permitted about the product thus assuring an even and uniform curing without warping or other distortion of the piece. The finished panel is then ready for installation and use.

Large panels, illustratively 2 feet by 4 feet, are preferably given additional support to resist chipping, cracking and breaking in handling and in use by incorporating in the panel a sheet of fabric or the like, such as burlap. This may be done in the manner following: after the mold or form is prepared as previously described, the fluid mix of proper consistency is poured into the mold up to, illustratively, half its depth. A piece of burlap, of a size slightly less than the inner dimensions of the mold, is then laid on top of the poured fluid mix and additional mix is then poured onto the burlap to fill the mold and completely form the panel.

After the material is set the product is removed from the mold and cured in the manner already described. The panel thus produced includes a fabric core which effectively resists the inception and spread of cracks, and the breaking and shattering of the panel.

Good results are obtained with the proportions following: 7–14 pounds of calcined magnesite (preferably substantially free from carbon dioxide and lime as mentioned above), 3–5 pounds of sawdust, 14–15 pounds of an aqueous solution of magnesium-chloride at 18° Baumé, (prepared in a manner previously described) and 4–6 ounces of syrup. The various ingredients may be prepared and mixed in the manner described and then poured into a mold.

The texture of the final product may be made finer by screening the sawdust or by using wood flour instead of the sawdust. Intermediate gradations in the fineness of finish may be achieved as desired by suitably proportioning the sawdust and wood flour.

Where a colored panel is desired, 1 ounce of a coloring material such as ferric or iron oxides and chromes may be added to each 2 pounds of dry ingredients. This coloring material is thoroughly mixed with the dry ingredients prior to the addition thereto of the chloride and syrup solution.

A lighter and more cellular panel may be made by changing the ingredients as well as the proportions used. For such a panel, 10 pounds of calcined magnesite (preferably free of carbon dioxide and lime), and 2½ pounds of wood flour, are thoroughly inter-mixed after which there is added 23 pounds of an aqueous solution of magnesium-chloride at 18° Baumé prepared in the manner described above, and 4 ounces of syrup, preferably molasses.

The whole is thoroughly mixed, then poured into a mold specially prepared as above described where it is allowed to set.

After the mix has set the resultant product or panel is removed from the mold and cured as described above, giving a finished product particularly suited for interiors as wall paneling, columns, partitions, and the like.

While in the above compositions the magnesium-chloride solution is preferably used at a density of 18° Baumé, good results are obtained where the densities of these solutions are varied between 18° and 26° Baumé; a change in the density of the solutions is found desirable in making panels of different thicknesses—a thick piece requiring a more dense solution than a thin piece in order to prevent setting of the outside before the inside hardens.

It will thus be seen that there has been provided in this invention an art and composition for building materials in which the various objects hereinbefore noted, together with many thoroughly practical advantages are successfully achieved. The product is strong, durable and well calculated to withstand the varying conditions of actual practical use. The use of a syrup, such as molasses, corn syrup or the like, substantially increases the strength and tenacity of the product.

The product is highly resistant to heat and cold transfer and thus is particularly advantageous as an insulator for refrigeration purposes. The insulating properties of the product may be increased by substituting cork sawdust for wood sawdust.

As many possible embodiments may be made of our invention and as many possible changes, alterations or variations may be made in the embodiment set forth, it is to be understood that our disclosures are to be taken as illustrative and not in a limiting sense.

We claim:

1. A building material of the class described comprising, in combination, the following ingredients in approximately the indicated proportions by weight, namely: calcined magnesite 12 parts; sawdust 3 parts; an aqueous solution of magnesium chloride at about 18° Baumé, 14 parts; molasses ¼ of 1 part; said ingredients being combined in a creamy fluid mixture sufficiently thin to be readily poured into a form or mold.

2. A building material of the class described comprising, in combination, the following ingredients in approximately the indicated proportions by weight, namely: calcined magnesite 9 to 12 parts; sawdust 3 to 5 parts; an aqueous solution of magnesium chloride at about 18° Baumé, 14 to 15 parts; sugar syrup ¼ of 1 part to ⅜ of 1 part; said ingredients being combined in a creamy fluid mixture sufficiently thin to be readily poured into a form or mold.

3. A building material of the class described comprising, in combination, the following ingredients in approximately the indicated proportions by weight, namely: calcined magnesite 9 to 12 parts; sawdust 3 to 5 parts; an aqueous solution of magnesium chloride at from 18° to 26° Baumé, 14 to 15 parts; sugar syrup ¼ of 1 part to ⅜ of 1 part; said ingredients being combined in a creamy fluid mixture sufficiently thin to be readily poured into a form or mold.

4. A method of making a building material which is characterized by forming a dry mixture of calcined magnesite and sawdust, proportioned by weight in the ratio of approximately 12:3; adding to the dry mixture a purified aqueous solution of magnesium chloride, at about 18° Baumé in the ratio of about 14 parts by weight of said solution to 12 parts by weight of the calcined magnesite; adding also a sugar syrup in the amount, by weight, of about ¼ of 1 part thereof to 12 parts of the calcined magnesite, and thereby forming a creamy pourable mix; and pouring the creamy mix into a mold and permitting it to set.

5. A method of making a building material which is characterized by forming a dry mixture of the following ingredients in approximately the indicated proportions by weight, namely: calcined magnesite 9 to 12 parts and sawdust 3 to 5 parts; adding to the dry mixture a purified aqueous solution of magnesium chloride, at about 18° to 26° Baumé, in the amount of 14 to 15 parts by weight, plus a sugar syrup selected from the group consisting of corn syrup and molasses in the amount of about ¼ to ⅜ of 1 part by weight, and thereby forming a creamy mix, and pouring the creamy mix into a mold and permitting it to set.

HARRY EDWARD PFAFF.
LLOYD RUSSEL SHAFFER.
ALEXANDER METHERELL.